United States Patent Office 3,449,246
Patented June 10, 1969

3,449,246
LIQUID ION EXCHANGE SEPARATION OF IRON FROM COPPER-IRON ORE MIXTURES
John R. Pelka, Glen Ellyn, and Lincoln Douglas Metcalfe, La Grange, Ill., assignors, by mesne assignments, to Armour Industrial Chemical Company, a corporation of Delaware
No Drawing. Filed Aug. 16, 1967, Ser. No. 660,927
Int. Cl. C02d 1/40; C22b 15/00
U.S. Cl. 210—38          11 Claims

ABSTRACT OF THE DISCLOSURE

A selective liquid-liquid ion exchange extraction process for the separation of iron from aqueous solutions of iron and copper or other metals, employing certain secondary-alkyl primary amines, their methylene diamine derivatives or certain aliphatic tertiary amines is disclosed. The process comprises contacting the aqueous solution with a water immiscible organic phase containing the amine or diamine extractant, the ratio of organic to aqueous being about 4:1 to 1:4, and separating the resultant iron-loaded organic phase from the aqueous phase. The useful extractants include secondary-alkl primary amines and the trimethylene diamines prepared therefrom wherein the alkyl radical contains from about 11 to 20 carbon atoms.

---

This invention relates to the hydrometallurgy of copper bearing ores, and in particular to a selective liquid-liquid ion exchange extraction process for the separation of iron from a solution containing copper, iron or other metals.

The commercial production of copper from oxide ores is mainly by hydrometallurgical, or leaching, methods. These methods involve treating the ore with a suitable solvent, such as sulfuric acid, which will take the copper into solution while leaving a major part of the undesirable gangue materials unaltered and the copper is then recovered in a relatively pure form from the leach solution. The leach solutions are generally subjected to some means of purification for the removal of the soluble iron and other objectional impurities. These means often involve neutralization and oxidation followed by the removal of the precipitated ferric salts. In the solvent extraction of copper from the rough concentrates of from the leached solutions, one of the most difficult problems is that of obtaining copper relatively free of iron.

We have discovered that iron can be selectively extracted from aqueous solutions of iron, copper and other metals. In accordance with the present invention iron can be removed by solvent extraction; after which the copper can be separated from the other metals by any of the conventional methods such as electrowinning. In more particularity, the process of the present invention comprises contacting an iron-copper-aluminum containing aqueous solution with a water immiscible organic phase containing certain secondary-alkyl primary amines, the trimethylene diamines prepared therefrom, or certain aliphatic tertiary amines as describe more fully hereinafter, whereby the iron is preferentially extracted into the organic phase. The iron-loaded organic phase is separated from the aqueous solution by virtue of their immiscibility. The iron can then be stripped from the loaded organic phase by contacting it with an aqueous stripping agent, and the organic phase recycled or reused in the process. The copper can then be separated from the aluminum-copper aqueous solution by any of the conventional methods such as electrolytic recovery wherein an insoluble anode and a copper cathode are immersed in a solution of copper sulfate and an electric current is passed across the cell so as to deposit copper on the cathode or by further selective solvent extraction methods followed by electrolytic recovery.

The amine and diamine extractants of this invention are of the following formulae:

(A) Secondary-alkyl primary amines.

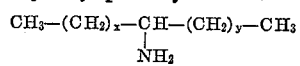

(B) Secondary-alkyl trimethylene diamines

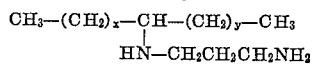

wherein $x$ and $y$ each are integers whose sum is from 8 to 17, provided that $y$ may be 0 and (C) Tertiary amines of the formulae:

and

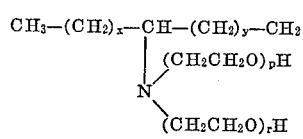

wherein $x$ and $y$ are as defined hereinabove, R is a secondary alkyl hydrocarbon radical containing from 11–20 carbon atoms, $R_1$ is a lower alkyl radical containing from 1 to 4 carbon atoms such as methyl, ethyl, propyl and the like and preferably methyl, and $p$ and $r$ are each positive integers whose sum is from 2 to 5. Exemplary primary amines which are desirable for use as the extractants of this invention include N-secondary-alkyl primary amines wherein the alkyl group is composed of a straight chain hydrocarbon containing 15 carbon atoms, and the primary amino group is located on the eighth carbon; and N-secondary-alkyl primary amine wherein the alkyl group is composed of a straight chain hydrocarbon containing from 11 to about 20 carbon atoms, and the amino group is located on the second to the sixth carbon atom in varying percentages. Amines of the foregoing description may be obtained commercially and are available under the trade name Armeen Primary Beta-Amine from the Armour Industrial Chemical Company, a division of Armour and Company. Further, they can be prepared by methods such as that taught by pending U.S. Patent application Serial Number 397,287 filed September 17, 1964, now U.S. Patent No. 3,338,967, entitled "Process for Preparing Secondary-Alkyl Primary Amines From Olefins and Products Thereof" to Potts et al. This patent teaches reacting an olefin with a nitrile and water in the presence of hydrogen fluoride to form an intermediate product, then reacting the intermediate product with a hydrolysis agent to form the secondary-alkyl primary amine. Due to the carbonium ion mechanism, the nitrogen atom of the nitrile may attach to the carbon chain of the olefin not only at carbon sites of the original double bond of the olefin, but also at carbon sites away from the original double bond. The mixed isomeric composition of the secondary-alkyl primary amine resulting thereby may be controlled by reaction conditions and by the composition of the olefinic compound used in the synthesis. Generally the sequence of addition of the reactants is determinative of the isomeric composition of the product. Some nitrile will add to each carbon atom of the primary olefin structure, excepting the terminal carbon atoms, thus resulting in a product which is a mixture of isomers. With an aliphatic alpha-olefin reactant, the favored point of attachment of the nitrogen group will be away from the beta-carbon atom and towards the center of the carbon chain. Suitable addition sequences resulting in isomeric product compositions with the attachment of the nitrogen group away from the site of the original olefinic bond include: addition of hydrogen fluoride, water and nitrile to a reactor and then addition of the olefin to the reactor; addition of hydrogen fluoride to a reactor, then the addition of nitrile and water followed by the olefin; and other combinations wherein the olefin is the last reactant added. Sequences of addition wherein the olefin is among the first reactants added to a reactor or wherein the addition of reactants is stepwise and the olefin is added prior to the last reactant will result in a product rich in isomers having the point of attachment to the nitrogen atom at and adjacent to the site of the original location of the double bond in the olefin molecule.

A suitable process for preparation of the N-secondary-alkyl diamines comprises reacting the secondary-alkyl primary amine and acrylonitrile in the presence of water to form a corresponding N-(beta-cyanoethyl) secondary-alkyl amine, and then hydrogenating the cyanoethyl compound in the presence of a hydrogenation catalyst, such as Raney nickel, to form the corresponding N-secondary-alkyl diamine compounds.

In addition to the above-described amine and diamine compounds, the organic phase generally includes other materials, such as an alcohol modifier to alter the surface tension and related physical properties of the organic-aqueous mixture, and a diluent. Such modifier is typically an aliphatic alcohol containing from 8 to 16 carbon atoms, such as n-octyl alcohol, n-decyl alcohol, n-dodecyl alcohol, n-tetradecyl alcohol, n-hexadecyl, isoamyl alcohol, 2-ethyl-hexanol, cyclohexanol alcohol, and mixtures of the foregoing alcohols. Decanol is preferred. Generally, no more than that minimum quantity of alcohol which will effectively inhibit formation of an emulsion or the occurrence of opposite phase entrainment will be used; preferably this is no more than 25% by volume. The presence of from about 2% to 10% by volume is usually satisfactory to modify the surface tension and related physical properties of the other constituents, and nil to 5% is preferred. Use of the alcoholic modifier is optional and it may not be included if desired. The particular diluent is not critical, for the amine and diamine extractants are soluble in many different common solvents. Suitable diluents are inert, non-polar, aliphatic or aromatic hydrocarbons, generally petroleum fractions. Examples of suitable diluents include heptane, benzene, petroleum fractions such as naphtha and derivatives thereof, and mixtures of the foregoing. Kerosene of high flash point and low aromatic content is generally preferred as the diluent for reasons of economy and low fire hazard.

The composition of the organic phase is not critical; it is only necessary that the amine or diamine compound be present in an amount sufficient to substantially extract the iron from the aqueous solution without extracting appreciable quantities of copper or aluminum. Generally, the extractant will be present in an amount of from about 2 to about 50% by weight, based on the total organic phase. It is, however, preferred for economic reasons that the organic phase consist of from about 2 to 5% by weight of the extractant, with about 5% being especially preferred, the remainder of the solution being the diluent.

A wide range of organic extraction solution to aqueous solution is operable. The organic/aqueous phase ratios of 1:4 to 4:1 are desirable and from 1:1 to 2:1 is especially desirable. Ratios beyond these are suitable but without further substantial advantage.

Temperature is not critical to the operability of the present process. The amine and diamine extractants are quite heat stable, remaining liquid at lower temperatures than alpha-amines and their derivatives. For convenience and economy we prefer room temperatures (about 65°–85° F.).

The iron metal values may be stripped from the loaded organic phase by employing an aqueous solution of a suitable stripping agent. A particularly preferred stripping agent is an aqueous caustic solution, such as a .5 N NaOH solution. Other agents include other caustic materials and even strongly acidic solutions of pH less than 1, such as .5 N aqueous sulfuric acid.

The liquid-liquid extraction process of the present invention can be carried out on a single stage batch basis or in a continuous counter-current mixer-settler unit. The number of stages can be varied as desired, depending on the efficiency of extraction and stripping. By adjustment of the relative volumes of aqueous metal-loaded solution, organic phase and stripping solution introduced to the liquid-liquid extraction apparatus, it is possible to achieve a high degree of iron concentrations in the organic phase without loading significant amounts of the copper or aluminum.

The present process can be used advantageously to extract iron from a wide variety of aqueous metal containing solutions. Such solutions are preferably acidic to a pH of about 3 to 5, but may be as acidic as pH 1.5 and may even be weakly basic to a pH of about 7.5 to 8. At higher pH levels the extractant will load more iron but will probably also load more of the other metals as the solution becomes neutral or basic.

Iron may be selectively extracted from aqueous solutions of copper and a wide variety of other metals by the present process. Such solutions include ore mixtures of copper, aluminum, zinc, molybdenum, manganese and the like depending on the source of the copper ore. Iron-copper-aluminum examples are illustrated as being the most common.

The invention is further described by the following examples, which are intended to be illustrative only and do not constitute limitations on the invention.

EXAMPLE I

An acidic aqueous leach solution was prepared to contain, per liter, 19.289 grams of iron, 1.458 grams of copper and 1.999 grams of aluminum oxide. Acidity was achieved with 1 N sulfuric acid, and the pH of the solution was adjusted to 1.5. The organic extraction solution was prepared by first adding the appropriate amount of amine or diamine extractant (4.7% on a weight per volume basis) to the decanol (9.3% on a volume basis), and then bringing to 100 cc. volume with kerosene. In instances where the activity of the amine or diamine extractant was not 100%, this fact was taken into consideration and that amount of the extraction which would equal 4.7% extractant on a weight/volume basis in the final organic solution was added.

The extraction process was as follows: to a one-half pint glass jar, 20 ml. of the leach solution and 50 ml. of the extraction solution was added (ratio by volume of 2.5 organic to 1.0 aqueous). The mixtures were then placed upon an automatic shaker, set on a high speed of approximately 270 oscillations per minute, and the solutions were allowed to mix for one-half hour. After the specified period for extracting, the samples were allowed to set for 10 minutes before observing. They were observed again 24 to 48 hours later. In cases where emulsions formed and had failed to break after 24 hours, a large quantity of chloroform was added and the contents of the glass jar were swirled. In most cases, a sufficient quantity of the leach solution was then recovered to allow an analysis to indicate the quantities of iron, aluminum and copper remaining in the aqueous leach solution. The lower the quantity remaining in the extracted leach solution, the greater efficiency of the particular amine or diamine to extract that metal from the aqueous solution and into the organic phase. The aluminum, copper, and iron contents of the extracted leach solutions were determined by colorimetric methods. The results of this testing are set forth in Table I.

TABLE I

| Sample | Solvent | Immiscibility of starting system | Appearance after extraction (10 min.) | Appearance after extraction (24 hrs.) | pH Leach sol'n after extraction | Analysis of aqueous after extraction | | | Percent removed | | |
|---|---|---|---|---|---|---|---|---|---|---|---|
| | | | | | | Fe, g./l. | Cu, g./l. | Al₂O₃, g./l. | Fe | Cu | Al |
| Original solution | | | | | | 19.289 | 1.458 | 1.999 | | | |
| N-secondary-alkyl (C₁₁-C₁₅) amine. | Kerosene | Total emulsion. | Same | Same | 3.12 | 0.127 | 1.265 | 2.017 | 99.3 | 13 | |
| N-secondary-alkyl (C₁₅-C₂₀). | Kerosene | Total emulsion. | Same | Same | 1.90 | 2.667 | 1.172 | 1.931 | 86 | 20 | 4 |
| N-secondary-alkyl (C₁₁-C₁₅)-N-trimethylene diamine. | Kerosene | 2 phase; emuls. in aq. phase; org. phase turbid. | Total emulsion. | Total emulsion. | (¹) | (²) | 0.815 | (²) | 100 | 44 | 100 |
| N-secondary-alkyl (C₁₅-C₂₀)-N-trimethylene diamine. | Kerosene | Total emulsion. | Same | Same | 1.95 | 0.896 | 1.357 | 2.016 | 95 | 7 | |
| 8-amino pentadecane | Kerosene | 2-phase emul. in aq. phase; org. phase turbid. | Same | Same | 2.28 | 0.262 | 1.235 | 1.817 | 98.7 | | |
| N,N-dimethyl-N-secondary-alkyl (C₁₅-C₂₀) (distilled) tertiary amine. | Kerosene | Total emulsion. | Same | Same | 1.70 | 5.376 | 1.394 | 2.030 | 72 | 5 | |
| Bis(2-hydroxyethyl)-N-secondary-alkyl (C₁₅-C₂₀)-tertiary amine (5 moles of ethylene oxide). | Kerosene | 2-phase; both turbid. | 2-phase; aq. phase turbid; emulsion in organic phase. | 2-phase; aq. phase turbid; emulsion in organic phase. | 1.92 | 6.144 | 1.430 | (³) | 68 | | |

¹ Insufficient quantity of aqueous phase to take pH.
² None detected.
³ Organic material present.

As can be observed from the above table, the preferred compounds of the instant invention function very efficiently to selectively separate the iron out of the foregoing exemplary solution of metal mixtures. The secondary-alkyl primary amines illustrated were very efficient, separating from over 85% to 99% of the iron while taking out only a small proportion of the copper and very little of the aluminum. The secondary-alkyl diamines illustrated above were even more efficient in the complete, or nearly complete, removal of the iron although also taking out more of the copper; and in one instance completely separating all of both the iron and the aluminum from the mixture. It is to be noted that two specific tertiary amines, viz N,N - dimethyl - secondary - alkyl (C₁₅-C₂₀) tertiary amine and bis-(2-hydroxyethyl-N-secondary-alkyl (C₁₁-C₁₅) tertiary amine, were effective in removing substantial proportions, almost 70%, of the iron while taking out nil or almost nil of the copper and aluminum. These two specific tertiary amines, while not being preferred because of the quantities of iron left in the aqueous mixture, are valuable for their extreme specificity in selectively extracting the iron without extracting the copper or the aluminum. With reference to the bis(2 - hydroxyethyl) tertiary amine, we also found that when it contained 4 moles of ethylene oxide, 58% of the iron, 56% of the copper and 63% of the aluminum were removed; however, when it contained 3 moles of ethylene oxide, the same percentage of iron but lesser percentages of the other two metals were removed, i.e., 58% iron, 46% copper and 43% aluminum.

While the present invention has been described and exemplified in terms of specific preferred embodiments, those skilled in the art will appreciate that variations can be made without departing from the spirit and scope of the invention.

What is claimed is:
1. A process for the separation of iron from an aqueous solution having a mixture of iron and other metals therein comprising:

(1) Contacting said aqueous solution of a pH from 1.5 to 8 with a water immiscible organic phase, the ratio of organic phase to aqueous solution being from about 4:1 to 1:4, said organic phase containing an amino extractant selected from the group consisting of:

(A) Secondary-alkyl primary amines of the formula:

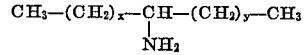

(B) Secondary-alkyl trimethylene diamines of the formula:

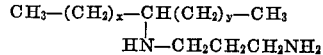

wherein $x$ and $y$ each are integers whose sum is from 8 to 17, provided that $y$ may be 0; and (C) Tertiary amines of the formulae:

and

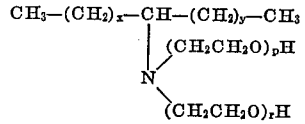

wherein $x$ and $y$ are as defined hereinabove, R is a secondary-alkyl hydrocarbon radical containing from 11–20 carbon atoms, $R_1$ is a lower alkyl radical containing from 1 to 4 carbon atoms and $p$ and $r$ are each positive integers whose sum is from 2 to 5; and (2) Separating the resultant iron-loaded organic phase from the aqueous phase.

2. The process as defined in claim 1 in which the pH of said aqueous solution is from 3 to 5.

3. The process as defined in claim 1 in which said pH is 1.5.

4. The process as defined in claim 1 wherein the organic phase is diluted with kerosene.

5. The process as defined in claim 1 wherein the amino extractant is N-secondary-($C_{11}$–$C_{15}$) alkyl amine.

6. A process as defined in claim 1 wherein the amino extractant is N-secondary-($C_{15}$–$C_{20}$) alkyl amine.

7. The process as defined in claim 1 wherein the amino extractant is N,N-dimethyl-N-secondary-$C_{22}$–$C_{15}$) alkyl amine.

8. The process as defined in claim 1 wherein the amino extractant is N,N-dimethyl-N-pentadecyl tertiary amine.

9. The process as defined in claim 1 wherein the amino extractant is bis - (2 - hydroxyethyl)-N-secondary-alkyl ($C_{11}$–$C_{15}$) tertiary amine.

10. The process as defined in claim 1 in which the organic phase contains from 2 to 50% by weight of the amino extractant and from 50 to 98% by weight diluent.

11. The process as defined in claim 10 in which said organic phase contains from 2 to 5% of the amino extractant.

References Cited

UNITED STATES PATENTS 3,082,062  3/1963  Preuss _____ 210—38 X

MICHAEL E. ROGERS, *Primary Examiner.*

U.S. Cl. X.R.

75—117

UNITED STATES PATENT OFFICE
CERTIFICATE OF CORRECTION

Patent No. 3,449,246                      June 10, 196

John R. Pelka et al.

It is certified that error appears in the above identified patent and that said Letters Patent are hereby corrected as shown below:

Column 6, lines 54 to 58, the formula should appear as shown below:

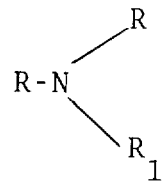

Signed and sealed this 23rd day of March 1971.

(SEAL)
Attest:

EDWARD M. FLETCHER, JR.                     WILLIAM E. SCHUYLER, JI
Attesting Officer                              Commissioner of Patents